(12) United States Patent
You et al.

(10) Patent No.: US 7,565,483 B2
(45) Date of Patent: Jul. 21, 2009

(54) METHOD AND APPARATUS FOR EXCHANGING DATA WITH A HARD DISK

(75) Inventors: Mingqi You, Beijing (CN); David Xiao D. Yang, Beijing (CN)

(73) Assignee: Vimicro Corporation, Beijing (CN)

( * ) Notice: Subject to any disclaimer, the term of this patent is extended or adjusted under 35 U.S.C. 154(b) by 811 days.

(21) Appl. No.: 11/262,152

(22) Filed: Oct. 28, 2005

(65) Prior Publication Data

US 2006/0139786 A1   Jun. 29, 2006

(30) Foreign Application Priority Data

Dec. 24, 2004   (CN) ........................ 2004 1 0102539

(51) Int. Cl.
*G06F 12/00*   (2006.01)
(52) U.S. Cl. ...................................... 711/112
(58) Field of Classification Search ....................... None
See application file for complete search history.

(56) References Cited

U.S. PATENT DOCUMENTS 6,587,416 B1 *   7/2003   Tsukihashi ............... 369/59.14
6,832,288 B2 * 12/2004   Ohta et al. .................. 711/112

* cited by examiner

*Primary Examiner*—Hiep T Nguyen
(74) *Attorney, Agent, or Firm*—Joe Zheng

(57) ABSTRACT

Techniques for storing and reading data on/from a hard disk are disclosed. According to one aspect of the present invention, a hard disk is provided with a parameter storage block for storing a number of parameters. One of the parameters is a last physical address the hard disk was accessed. The last physical address is used as a reference to read data segments onto the hard disk. Each of the data segments is a compressed version of a portion of data to be stored in the hard disk. A portion of the data is allocated in accordance with a predefined time period. Accordingly, the compressed data portion also includes a header including information about the compressed data portion. The information includes at least a compression scheme used as well as the time about the data portion. Based on how the data is stored, a corresponding reading method is also provided.

17 Claims, 3 Drawing Sheets

METHOD AND APPARATUS FOR EXCHANGING DATA WITH A HARD DISK

BACKGROUND OF THE INVENTION

1. Field of the Invention

The present invention relates to the area of data storage and data reading, and more particularly to method and apparatus for storing and reading data on/from a hard disk.

2. Description of Related Art

Currently, the popular file systems are FAT12, FAT16, FAT32, NTFS, EXT2, EXT3, etc. These file systems are all composed of a file directory indexed list and a cluster list. A file in these file system may occupy a lot of discontinuous clusters. When the hard disk is required to be read and written, a magnetic head provided in a hard disk will jump and reposition according to the discontinuous clusters of the file. As shown in FIG. 1, it is a flow diagram for reading a file in a hard disk that adapts the conventional file system. It includes operations as follows: obtaining a file directory indexed list; reading out a first cluster assigned to an objected file from the file directory indexed list; reading out a content from the cluster assigned to the file; determining if the file is completely read out; if so, ending the operation; if not, obtaining a next cluster assigned to the file and repeating the corresponding operations mentioned above. Due to discontinuous clusters of the file, the magnetic head provided on the hard disk will frequently jump and reposition to a cluster a few clusters away. This jumping and reposition process is the major reason for the hard disk depreciation. For writing disk fragmentation and making the hard disk involve in more repositioning operations.

In some applications which require to process a large amount of data, such as monitoring industry which needs to store the video data on the hard disk every day, so a large quantity of writing operations are needed on the hard disk. In this special application, if adopting conventional file system to manage and store the data on the hard disk, the service life of the hard disk may be significantly affected and the cost for the operation increases.

Thus there is a need for techniques for storing and reading data on/from hard disk with minimum affect on the service life thereof.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Techniques for storing and reading data on/from a hard disk are disclosed. According to one aspect of the present invention, a hard disk is provided with a parameter storage block for storing a number of parameters. One of the parameters is a last physical address the hard disk was accessed. The last physical address is used as a reference to read data segments onto the hard disk. Each of the data segments is a compressed version of a portion of data to be stored in the hard disk. A portion of the data is allocated in accordance with a predefined time period. Accordingly, the compressed data portion also includes a header including information about the compressed data portion. The information includes at least a compression scheme used as well as the time about the data portion. Based on how the data is stored, a corresponding reading method is also provided.

The present invention may be implemented in hardware and software as a system, an apparatus or a method. According to one embodiment, the present invention is a data storage method for a hard disk, the hard disk provided with a parameter storage block for storing a last physical address accessed, the method comprises reading the last physical address; positioning a magnetic header of the hard disk at a next physical address adjacent to the last physical address; and writing data into continuous storage spaces on the hard disk according to a magnetic track sequence.

According to another embodiment, the present invention is a method for reading data in a hard disk, the method comprises calculating a minimum offset address of a data package in the hard disk according to a compression scheme, wherein the data package includes a portion or all of the data; reading an identifier of the data package according to the minimum offset address; and determining if the identifier of the data package corresponding to an identification of the data. If the determining operation is not confirmed, reading an identification of a next data package according to a sequence, and continuing the determining operation is confirmed; and if the determining operation is confirmed, reading the data package.

According to yet another embodiment, the present invention is a data storage method for a hard disk, the hard disk provided with a parameter storage block for storing a last physical address accessed, the method comprises allocating a storage block for storing a plurality of status parameters; segmenting data into a plurality of segments, each corresponding to a predefined time period; compressing each of the segments into a data package, wherein the data package includes a header having a compression time and compression information of how the data package is compressed; reading a first physical address according to the status parameters; storing the compressed segments into continuous storage spaces with reference to the first physical address till all compressed segments are stored; and resetting the first physical address to a second physical address.

One of the objects, features, and advantages of the present invention is to provide an efficient accessing mechanism of a hard disk.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
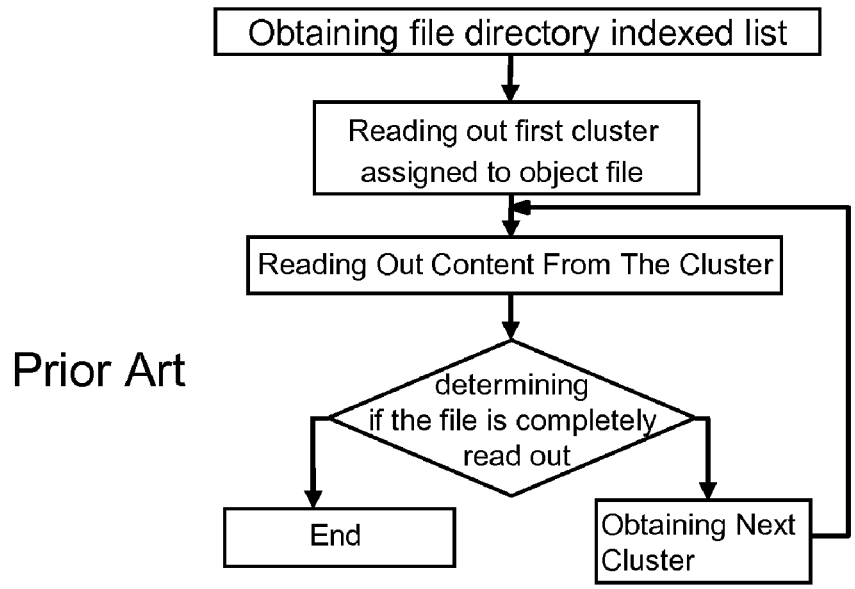
FIG. 1 is a flowchart for reading a file in a hard disk according to a conventional file system.

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

According to one embodiment of the present invention, a hard disk is provided with a storage block for storing a plurality of status parameters thereof. The status parameters comprise use identification information which identifies if the hard disk is in use or not, and a last physical address that was accessed. In one embodiment, the status parameters are stored as a block at 0-th address of the hard disk. When a hard disk is used for the first time, namely it is a new hard disk, the identification information of the status parameters and the last physical address shall be set at 0. When all data are completely deleted from the hard disk, the identification information of the status parameter and the last physical address shall be refreshed to 0 as well, thus demonstrating that no data is stored in the hard disk.

According to one embodiment, a data storage method comprises the following operations: reading a last physical address of the disk that was accessed, positioning a magnetic header provided in the hard disk at a next physical address adjacent to the last physical address; writing data into a continuous storage space on the hard disk according to a magnetic track sequence. When receiving a stopping order about data storage on the hard disk, the current physical address being accessed will be updated as the last store physical address in the status parameters.

In order to conveniently search the stored data and make full use of the hard disk resources, before storing the data into the hard disk, the data shall be compressed into a data package according a predefined time length (e.g., one minute), and a corresponding data package header containing a compression time and compression information of the corresponding data package shall be generated and added in the front of the corresponding data package. The data package header and its corresponding data package will be stored into the hard disk according to the magnetic track sequence.

Figure 2:
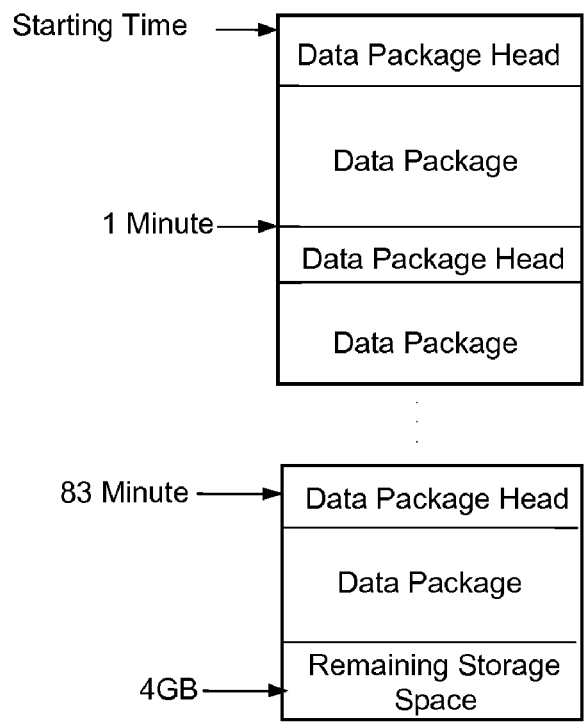
FIG. 2 is a diagram showing a data storage architecture for a hard disk according to one embodiment of the present invention.

As shown in FIG. 2, provided that a set of image data needed to be stored into a hard disk. It is assumed that each image frame is about 40 KB in size, and 20 frames can be compressed within one second, the one-minute image data needed to be stored into the hard disk is 48M in size. The image data in one minute shall be compressed into a data package, and a data package header shall be added in the front of corresponding data package. This data package header records the compression time and compressibility information of this data package as well as other information defined by the user.

Figure 3:
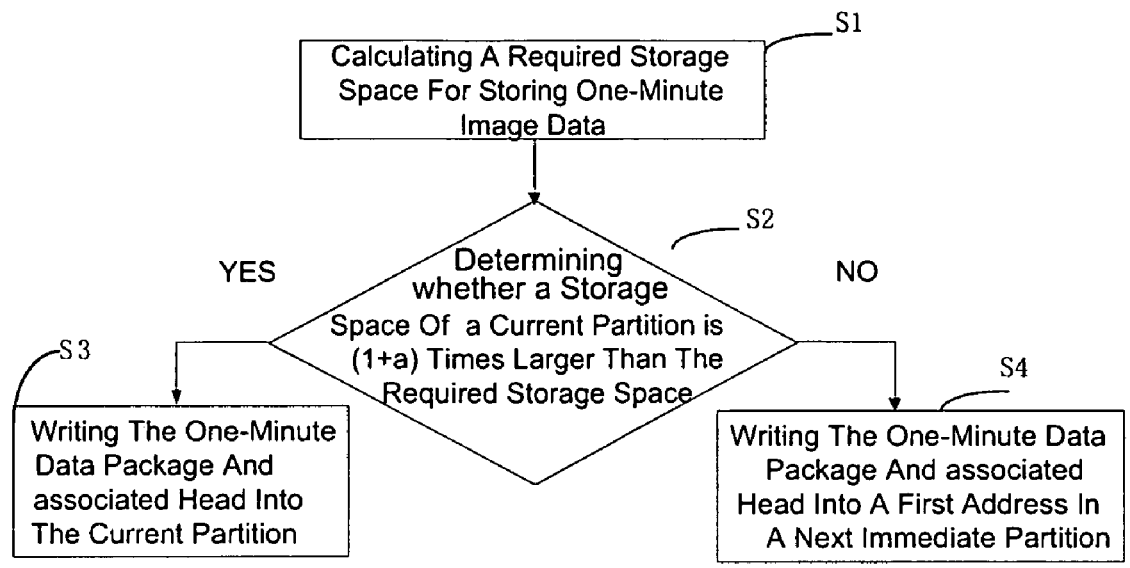
FIG. 3 is a process or flow diagram of an exemplary data storage method according to one embodiment of the present invention.

In order to conveniently search the stored data at any time, the hard disk is partitioned into a number of storage areas. For example, the hard disk can be partitioned into several storage areas, each volume thereof is 4 G in size. If the above example of compressing one minute image data into a data package continues, for the purpose of aligning each data package header with corresponding data package in each storage area, before storing a new one-minute image data package, the following operations shown in the FIG. 3 shall be conducted.

At S1, calculating a required storage space for storing the one-minute image data according to a compression scheme. Referring to the above-mentioned example, the one minute image data is 48M in size; At S2, determining if a remaining storage space of the current partition in the hard disk is (1+a) times larger than the required storage space, where "a" represents a ratio of an exceeding part of the maximum file generated under the compression scheme (assuming all are compressed per the compression scheme) against a target size, generally it is a number that is less than one. If the determining is confirmed, the operations is taken to S3, if not, the S4 is carried out.

At S3, writing the one-minute data package and the data package header into the current partition in the hard disk according to the magnetic track sequence. At S4, positioning the hard disk magnetic header at a first address in a next immediate partition, and writing the one-minute data package and the corresponding data package header.

Figure 4:
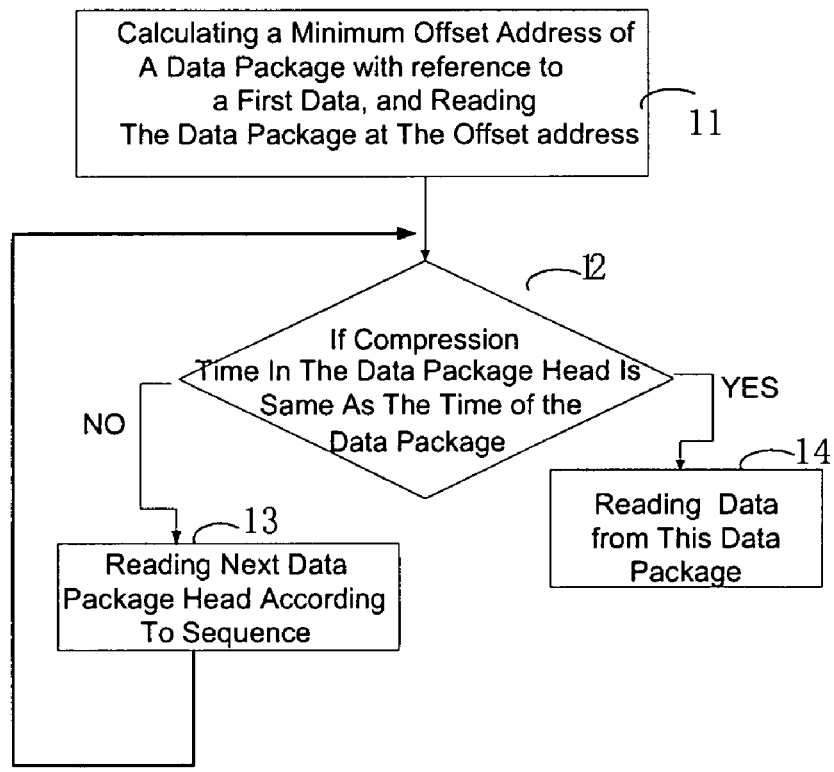
FIG. 4 is a first process or flow diagram of a data reading method in the present invention.

According to another embodiment, a corresponding data read method is provided in the present invention. Supposing that a user wants to search the image data that has been written into the hard disk at a certain time (e.g., data starting at 5 minutes from the beginning), if the hard disk is not partitioned, FIG. 4 shows a flowchart or process according to the embodiment. At 11, according to the compression that is used to compress the data, calculating a minimum offset address of the data package at a designated time in relation to the first data package of the hard disk and reading the data package and the corresponding header at this offset address. At 12, determining if the compression time in the data package header is the same as the designated time or within a time range between the recorded compression times of this and next data package headers, if so, the process goes to 14, if not, the process go to 13.

At 13, reading the next data package and corresponding header according to sequence and returning to 12. At 14, reading the data from this data package until the user sends the command to stop the reading operation.

Figure 5:
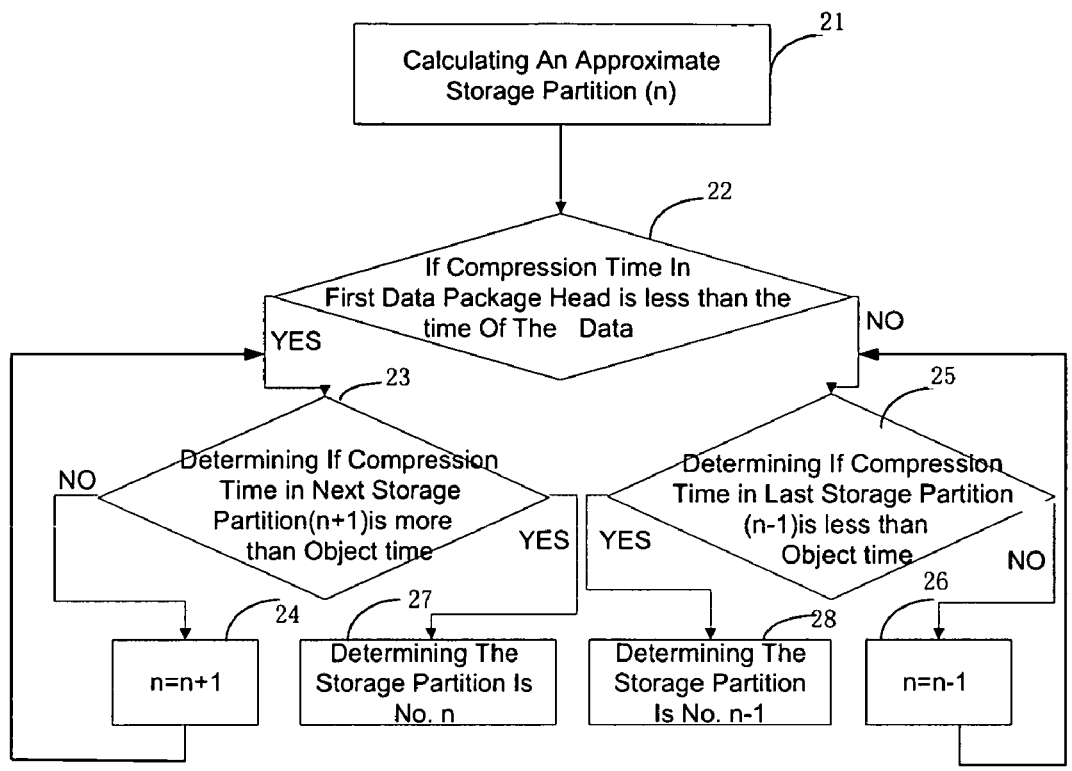
FIG. 5 is a second process or flow diagram of the data reading method in the present invention.

On the other hand, if the hard disk is partitioned, when a user needs to read the data stored at a designated time, at first, the system needs to locate the storage partition where the image data at the designated time is stored. FIG. 5 shows a flowchart or process according to one embodiment of the present invention.

At 21, according to the compression in the data storage method and a start time of the hard disk data storage, calculating an approximate storage partition (n) where the objected data is stored. At 22, reading the first data package header of the approximate storage partition (n) and determining if the recorded compression time in the first data package header is less than the designated time. If so, the process goes to 23; if not, the process goes to 25.

At 23, reading a first data package header in the next storage partition (n+1) and determining if the recorded compression time in the first data package header is more than the designated time. If so, the process goes to 27; if not, the process goes to 24. At 24: increasing n by one, the process then goes to 23. At 25, reading a first data package header and determining if the recorded compression time in the data package header is less than the designated time. If so, the process goes to 28; if not, the process goes to 26;

At 26, decreasing n by one and switching to 25. At 27, determining the storage partition storing the image data of the designated time is the storage partition No. n. At 28, determining the storage partition storing the data of the designated time is the storage partition No. n−1.

Figure 6:
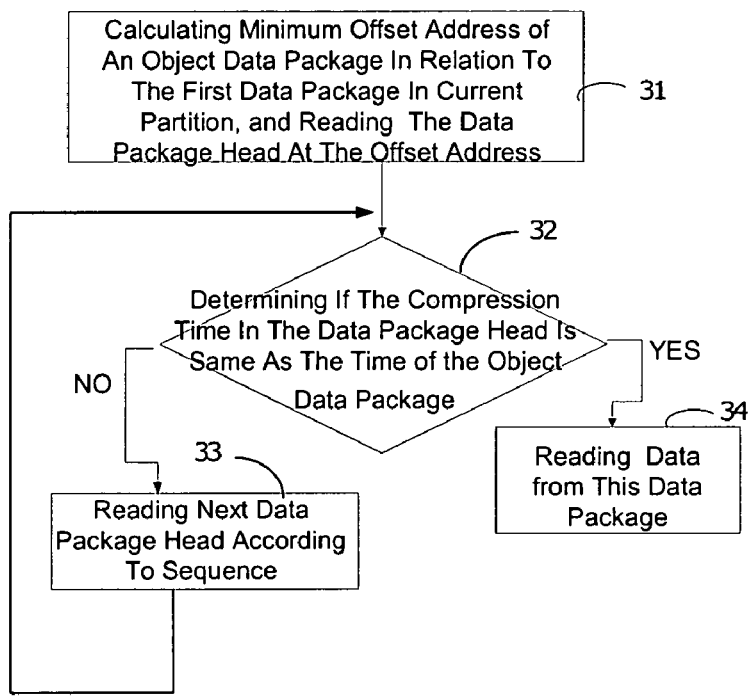
FIG. 6 is a third process or flow diagram of the data reading method in the present invention.

After the storage partition storing the image data of the designated time is determined, the exact storage address location in this storage partition storing the data of the designated time shall be further determined. FIG. 6 shows a flowchart or process according to one embodiment of the present invention.

At 31, according to the compression in the data storage method, calculating a minimum offset address of the data package at the designated time in relation to the first data package of the current storage partition and reading the data package and the corresponding head at this offset address. At 32, if the compression time in the data package head is same as the designated time or within a time range between the recorded compression times of this and next data package headers. If so, the process goes to 34; if not, the process goes to 33.

At 33, reading the next data package and the corresponding header according to the sequence and returning to 32. At 34, reading the data from this data package until the user sends the command to stop the reading process.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A data storage method for a hard disk, the hard disk provided with a parameter storage block for storing a last physical address accessed, the method comprising:
    reading the last physical address;
    positioning a magnetic header of the hard disk at a next physical address adjacent to the last physical address; and
    writing data into continuous storage spaces on the hard disk according to a magnetic track sequence.

2. The data storage method as claimed in claim 1, wherein a current physical address being an address for storing a last portion of the data is updated as the last physical address in a parameter storage block.

3. The data storage method as claimed in claim 2, wherein the parameter storage block is provided at a 0-th address of the hard disk.

4. The data storage method as claimed in claim 2, wherein the parameter storage block further stores use identification information indicating if the hard disk is in use or not.

5. The data storage method as claimed in claim 4, wherein, when the hard disk is used for a first time, the identification information and the last physical address are set to 0, and wherein, when all data are completely deleted from the hard disk, the identification information and the last store physical address are refreshed to 0.

6. The data storage method as claimed in claim 1, wherein before storing the data into the hard disk, the data is compressed into data packages according a predefined time length, each of the data packages including a corresponding data package header that includes an identifier.

7. The data storage method as claimed in claim 6, wherein the data package header further includes a compression time and compression information of the corresponding data package.

8. The data storage method as claimed in claim 1, wherein the hard disk is partitioned into a plurality of storage areas so that before storing the data package, the following operations are conducted:
    calculating a required storage space for storing a portion of the data in terms of a predefined time period according to a compression scheme;
    determining if a remaining storage space of a current partition in the hard disk is (1+a) times larger than the required storage space, wherein "a" represents a ratio of an exceeding part of the portion generated under the compression scheme; and
    writing the data package and the data package header into a partition corresponding to the storage space according to the magnetic track sequence if the determining is confirmed.

9. A method for reading data in a hard disk, the method comprising:
    calculating a minimum offset address of a data package in the hard disk according to a compression scheme, wherein the data package includes a portion or all of the data;
    reading an identifier of the data package according to the minimum offset address;
    determining if the identifier of the data package corresponding to an identification of the data;
    if the determining operation is not confirmed, reading an identification of a next data package according to a sequence, and continuing the determining operation till the determining operation is confirmed; and
    if the determining operation is confirmed, reading the data package.

10. The method as claimed in claim 9, wherein the hard disk is partitioned into a plurality of storage areas, and further comprising: calculating a storage partition (n) where the objected data package is stored.

11. The method as claimed in claim 10, further comprising: reading the first data package header of the storage partition (n) and determining if a recorded compression time in the data package header is less than a designated time.

12. A data storage method for a hard disk, the hard disk provided with a parameter storage block for storing a last physical address accessed, the method comprising:
    allocating a storage block for storing a plurality of status parameters;
    segmenting data into a plurality of segments, each corresponding to a predefined time period;
    compressing each of the segments into a data package, wherein the data package includes a header having a compression time and compression information of how the data package is compressed;
    reading a first physical address according to the status parameters;
    storing the compressed segments into continuous storage spaces with reference to the first physical address till all compressed segments are stored; and
    resetting the first physical address to a second physical address.

13. The data storage method as claimed in claim 12, wherein the first address is a last address that the hard disk was accessed at.

14. The data storage method as claimed in claim 13, wherein the last address is one of the status parameters.

15. The data storage method as claimed in claim 12, wherein the second physical address is now a last address the hard disk is accessed at.

16. The data storage method as claimed in claim 15, wherein the last address is one of the status parameters.

17. The data storage method as claimed in claim 12, wherein the storage block is located at 0-th address of the hard disk.

* * * * *